Nov. 4, 1941.   H. D. SCHRIER   2,261,416
METHOD OF MAKING CONTAINERS
Filed July 4, 1939
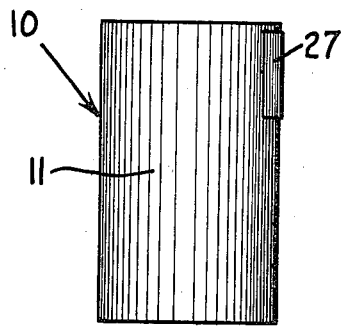
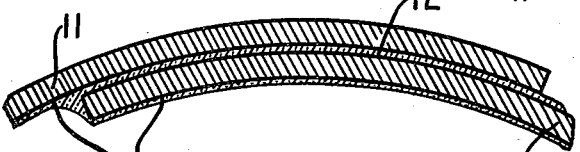
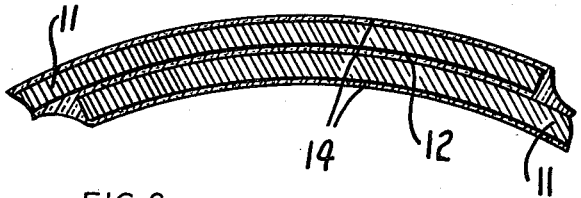
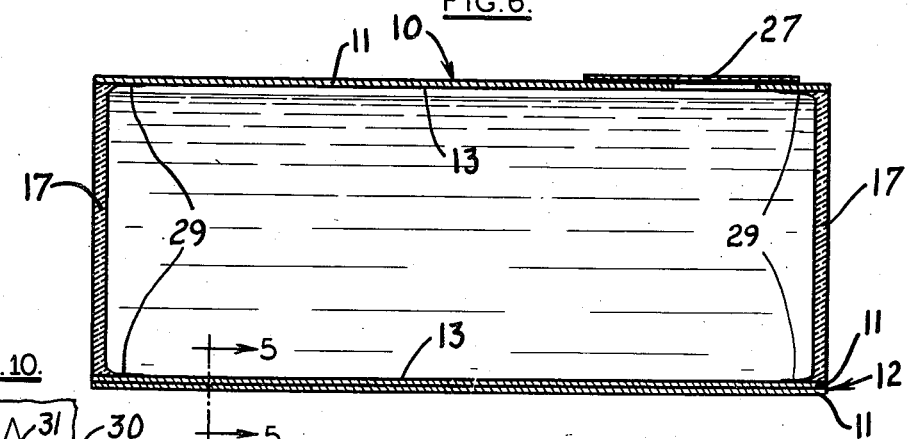
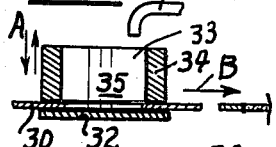
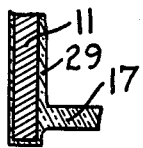
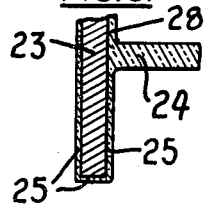
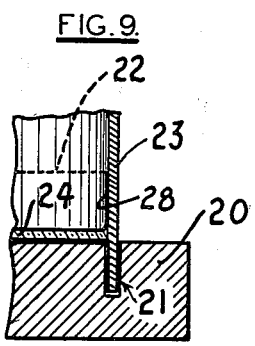
INVENTOR.
HAROLD D. SCHRIER.
BY Thomas G. Boman
ATTORNEY Patented Nov. 4, 1941

2,261,416

UNITED STATES PATENT OFFICE 2,261,416

METHOD OF MAKING CONTAINERS

Harold D. Schrier, Kalamazoo, Mich.

Application July 4, 1939, Serial No. 282,770

6 Claims. (Cl. 18—59)

My invention relates to containers and more particularly to the method of manufacturing them. Also, it relates to the method of applying windows thereto.

As set forth in my patent for Containers, No. 2,164,354, filed September 8, 1936, I am the inventor of a novel type of container and the present application is a continuation thereof.

Briefly described, the present method contemplates forming paper board to the desired shape, coating the same, either before or after forming, with cellulose, and then flowing in liquid material as cellulose into any desired opening and permitting the same to harden.

One of the main advantages of my invention lies in the novel combination of paper board, a relatively cheap material, with a very delicate and thin protective coating such as cellulose, resins, synthetic resins, vinolyte, abietic acid film, plastic emulsions such as bentonite and members of the chlorinated solvenized rubber group as Tornesit and Pliofilm, the resultant being a coated product which is not only liquid-proofed but which is also strengthened. The protective coating forms a relatively smooth film upon its outer face but its inner face tends to follow the irregularities of the paper with the result that the coating penetrates into the fibres of the paper and produces a secure bond therewith.

Another very material advantage of my container lies in the fact that the end walls thereof, these preferably being transparent or translucent, are placed in the container by a novel process whereby they are not under any initial strain and thus a better article is produced.

That is, the liquid material is flowed to its position, and by virtue of said liquidity flows to every point without any strains being set up. It follows an irregular outline just as easily as a perfectly symmetrical one. Consequently, the method produces perfect results even in irregularly formed boxes or tubes.

And, along this same line, the end walls are reinforced by means of a reinforcing band which is formed during the formation of the said end walls, the band, in many instances, having a width several times greater than the thickness of the end wall with which it is integrally united.

Yet another feature of my invention is to provide an inexpensive container which is especially well adapted for consumer liquids, as oil, beer, milk and the like. Also, many other uses will become apparent, to one skilled in this art, as the description proceeds. For instance, it is a desirable method for closing one end of a mailing tube, its transparency permitting postal inspection, its sturdiness providing strength.

Another feature is the transparency, possible with certain protective coatings, as, for example, cellulose, given to the desired portions of the box or container, exposing the contents to view. Yet an air tight and liquid tight seal is had. It is also very desirable as a package for coffee.

Another feature lies in the utilization of the same type of protective coating as a joinder for a longitudinal seam of the tubular container.

Yet another feature of importance is the fact that my novel method can be used in the production of recessed ends to any chosen depth. That is, it might be desirable to have the ends set back or recessed ¼" and this can be easily accomplished. Also, my method is applicable to tapered containers of any slant or shape.

One very important phase of my invention is the novel method in which a window may be inserted into a coated or non-coated carton, this method permitting a very economical installation inasmuch as overlap, now needed under the present practice of gluing sheet material in place, is practically eliminated and my process gives a very efficient installation inasmuch as any desired shape of window may be readily installed.

Other objects of this invention, not at this time set forth, will be understood as the description proceeds.

In the drawing:

Fig. 1 is a view in elevation of a cylindrical container.

Fig. 2 is a top plan view of the container shown in Fig. 1.

Fig. 3 is an illustrative sectional view showing the longitudinal joint or seam.

Fig. 4 is a view similar to Fig. 3 but also showing the application of the cellulose or the like to the inner side of the container.

Fig. 5 is a view similar to Figs. 3 and 4, this view being taken along the plane of the line 5—5 of Fig. 6, but being drawn to an enlarged scale.

Fig. 6 is an enlarged view in longitudinal cross section of the container shown in Figs. 1 and 2.

Fig. 7 is an enlarged fragmentary sectional view of the corner construction of the container shown in Fig. 6.

Fig. 8 is a view similar to Fig. 7 but showing a slightly different type of construction.

Fig. 9 illustrates a structure for making the construction shown in Fig. 8.

Fig. 10 is a fragmentary view of a side having an irregular opening.

Fig. 11 is a side view showing the step of applying the material to the opening.

Fig. 12 is a top view of the vat for the liquid material.

Referring to the drawing, 10 is a container formed by rolling the paper board 11 upon itself and securing the overlapping ends together by cellulose 12. As is shown in Fig. 3 the cellulose extends well beyond the overlapping edges of the paper board whereby the next application of cellulose 13, see Fig. 4, or the double application of cellulose 14, see Fig. 5, dissolves the previous application to cause integral and secure joinder and to make a liquid-proof joint.

The cellulose material which I prefer to use, is plastic regenerated cellulose, and contains a solvent which renders the material liquid for application to the paper board and for molding to form the end members or walls of the container body. Such cellulose is an excellent adhesive and not only holds the overlapping parts of the container in place, but greatly strengthens the structure of the finished container. The cellulose, when hard, is transparent, permitting one to look through the container from end to end. With translucent liquids the effect is startling and pleasing, and the customer may assure himself that the liquid in the container is pure and of full measure.

As shown in Fig. 6, panes 17 are molded into place. This is done after the open ended container has been sprayed or dipped to form the thin film completely thereover, see Figs. 5 and 6, or else only partially thereover as typified by Fig. 4.

The container may be set upon end and the liquid cellulose or the like poured thereinto, the depth of the cellulose, if this is used, being about eight times its finished depth. That is, the solid deposit of the cellulose from solution amounts to about ⅛ of its initial volume. This occurs in a series of steps, a sequential depositing of a complete layer or disc of the solid over the entire end area of the container and thus strains are eliminated. It is entirely different from the hardening of, say, molten metal. If other solutions or emulsions are used they will shrink in direct ratio to the percentage of solvent. If thermoplastic coatings are used in liquid state, the volume will remain constant. Preferably the container is set upon a non-bonding surface as tin, glass or the like. Or, since the fluid utilized is viscous, the same may be initially poured over the chosen surface, and then the tube placed over the expanding outline of the viscous fluid. This method eliminates the necessity of pouring the cellulose or the like through the tube.

Referring now to Fig. 9, numeral 20 indicates a form having a groove 21 into which the edge of the liquid cellulose, shown in dotted lines 22, to be interiorly positioned from the end of the container 23. The final outline of the transparent end is indicated at 24. And, as shown at 28, the recession of the liquid leaves a thickened reinforcing rib which strengthens the container and forms a bond between the end closure and the side members.

Fig. 8 shows a cross sectional view of a part of Fig. 9 illustrating how the cellulose forms a thin film 25 upon the paper board and joins onto the pane or end portion 24. It will be noted that the end pane is recessed very materially from the end of the container.

Fig. 7 illustrates the end pane 17, this pane being located substantially in the end of the container 10. See Fig. 6. And, as shown in Figs. 6 and 7, reinforcing portions 29 of annular shape are formed during the application of the liquid material.

The container body 11 may have an opening therethrough to fill the same and be sealed with a patch 27. See Fig. 1. Or, if desired, this opening may be sealed as described with respect to Figs. 10, 11 and 12.

My container, when coated with a cellulosic compound, will withstand a temperature of 650° Fahr., without charring, yet it may be readily destroyed by burning. The end panes of my container, while tough and strong, may be readily punctured with a sharp instrument to drain the contents.

The method of making my containers permits a wide variation in the cross sectional shape of the container body. The desired cross sectional shape may be selected in accordance with the relative importance of the saving of packing space and the container material or as a preference as to attractiveness of design.

Referring now to Figs. 10, 11 and 12, numeral 30 indicates a flat or curved side of a container having an irregularly shaped window or opening 31.

Fig. 11 shows the side 30 positioned in place over a supporting plate 32, formed of metal or the like, whereby the material used, as, for instance, cellulose, will not adhere thereto, the opening 31 being exactly over the said plate.

A metal vat or die 34, see Figs. 11 and 12, is vertically movable as indicated by the arrows A, and thus can be positioned against the surface of the side 30, the vat 34 having an opening similar to the opening 31 in the side 30. The vat opening, designated 33, may be slightly larger than the opening 31 whereby it slightly overlaps the same. The parts may be positioned as shown in Fig. 11 and then a controlled amount of the cellulose or the like flowed into the vat 34 through the pipe 36 as at 35. The deposit is gradually made, no agitation being permitted as this would destroy the sequential depositation, and then the vat is raised and the side removed. The showing at the right of Fig. 11 illustrates a finished portion of a side showing the molded side in place. That is, the finished portion has been removed from the machine as indicated by the arrow B.

One method of making my containers is as follows:

A blank of paper board is cut out and then bent to the chosen shape, the several overlapping portions, as needed, being fastened together by the cellulose or other material. The formed article, with openings or openings as desired, is now sprayed or coated in any chosen manner. Or the coating may be done prior to its being bent to shape. The panes over the several openings are now flowed to place, maintained below the boiling point of the material, not agitated and let quietly set so as to harden in sequential layers or deposits.

Both the cellulose material or other material and paper board are relatively cheap compared to materials now commonly used for consumer liquids as oil, beer and milk. By combining liquid materials of the classes described and paper in the manner set forth above, I provide an ideal method of manufacturing a container or the like which is less expensive than glass or metal and which is disposable by burning after use. And, I deem it within the purview of my invention to coat a tin or glass structure or tube and flow in the ends.

The ends may be transparent or not, and may have a reinforcing element, as, for example, a paper disc, incorporated therein. This would simply be laid in place and the liquid floated or flowed therearound. Additionally the paper disc might have a vent, capped if desired, incorporated therein.

While my container is especially well adapted for consumer liquids, it may be used for solids as coffee, tea, rice, breakfast foods, cereals and the like.

Having thus described my invention, I claim as new and desire to secure the following combinations and elements, or equivalents thereof, by Letters Patent of the United States.

I claim:

1. The method of manufacturing a container of the class described which comprises, providing a container body having an opening therein, said container body being formed of paper board, coating the edges of the said opening and both the inner and outer surfaces of the said container extending away from the said opening for the desired distances with cellulose, said cellulosic coating being of sufficient quantity to form a continuous and consequently liquid-proof film and extending more or less into the fibres of the paper board, then introducing and maintaining a relatively large quantity of cellulosic material in liquid form into and across the said opening, said liquid cellulose being capable, through solvent action, of uniting with the cellulosic coating, said container body serving as a wall to partly support the liquid cellulosic material whereby the same, through solvent action, unites with the continuous film and then permitting the liquid to harden.

2. The method as set forth in claim 1 in which the bottom plane of the liquid is kept stationary, with respect to the container body, during its initial hardening process.

3. The method of making a container which comprises, providing an open ended tube with an intermediate opening therethrough, coating the same with regenerated cellulose material, standing the tube upright, closing the lower end thereof, pouring a similar cellulosic material of liquid form into the tube against the closure, said quantity of liquid being insufficient to dissolve the aforesaid coating but sufficient to provide a self sustaining end closure, permitting the liquid to harden, and again performing a substantially identical process at and upon the other end of the tube.

4. The method of forming a window or the like in a paper board carton or the like which has the desired opening therein, comprising, placing a non-perforate and water-tight supporting member underneath the paper board directly beneath the opening and forming a tight juncture with the underside of the paper board, providing a retaining member around the edge of the opening, said retaining member being formed of material to which cellulosic material will not adhere, providing a seal between the retaining member and the supporting member, filling the retaining member with cellulosic material, letting it set below its boiling point and without agitation whereby it gradually hardens in deposits for the purpose described, and finally removing the said retaining member.

5. The method of manufacturing a partially transparent container, which method consists in providing an open ended cylindrical container made of paperboard or the like, coating the inner surface of said container with a plastic material, standing the container on its end, placing a non-perforate and water-tight supporting member underneath the container directly beneath the end thereof, said member extending upwardly into the container a slight distance, said retaining member being formed of material to which cellulosic material will not adhere, filling the retaining member with a predetermined amount of cellulosic material, letting it set at room temperature and without agitation whereby it gradually hardens in deposits to provide a transparent end closure and a reinforcing band immediately thereabove for the purpose described, removing the supporting member and then repeating the process at the other end of the container.

6. The method of making a window of the type described comprising the following steps, providing a piece of material with an opening therethrough, coating the edges of the opening with a cellulosic material to provide a film, said cellulose entering the pores of the material, said film being liquid proof, permitting the material to dry, then flowing and maintaining a quantity of cellulosic material in liquid form across the opening, said liquid cellulose being capable, through solvent action, of uniting with the cellulosic coating, and permitting the material to dry.

HAROLD D. SCHRIER.